UNITED STATES PATENT OFFICE 2,459,835

ALLYLATION OF DIHYDROXY BENZENE

Kenneth P. Monroe, Butler, Pa., assignor to Koppers Company, Inc., Pittsburgh, Pa., a corporation of Delaware No Drawing. Application October 24, 1947,
Serial No. 782,041

13 Claims. (Cl. 260—621)

This invention relates to compounds produced by the allylation of dihydroxybenzenes. More particularly the invention relates to a process of producing diallyl resorcin.

Diallyl resorcin has two allyl groups attached to the nuclear carbons of the resorcin ring with the following structural formula:

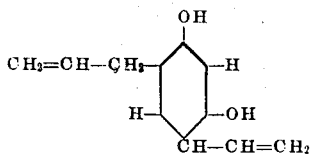

The allyl group is a monovalent radical having a double bond so that it is very reactive. The diallyl resorcin is well adapted for various types of resinification reactions such as reacting in the phenol formaldehyde condensation and in the formation of vinyl resins.

Diallyl resorcin will readily co-polymerize with any organic compound having an active vinyl group therein. For example, diallyl resorcin is well adapted for the upgrading of drying and semi-drying oils by co-polymerization with the unsaturated fatty acids in these oils.

I have discovered that diallyl resorcin may be formed by the nuclear alkenylation of resorcin with allyl halides, particularly allyl chloride. It is very important, however, in this nuclear alkenylation that the pH of the aqueous reaction mixture must be maintained between 5 and 7 to obtain the maximum yield with a minimum loss of raw products. The allylation of resorcin is an exothermic reaction which sets free hydrochloric acid. Therefore the allyl chloride is added to the resorcin as a series of fractional portions and, prior to the addition of the allyl chloride, a base solution, such as sodium hydroxide is introduced into the reaction mixture to neutralize the hydrochloric acid as formed. In addition it is important that the resorcin be dissolved in a buffer solution, such as sodium acid phosphate, the buffer acting to maintain the reaction solution with a pH between 5 and 7.

The primary object of the present invention is to provide a process of making diallyl resorcin which will give a maximum conversion of the raw materials with an ease of operation.

Another object of the invention is to provide a process of making high quality diallyl resorcin from commercial grades of raw materials.

With these and other objects in view the invention consists in the process of making nuclear allylated dihydroxybenzenes as hereinafter described and particularly defined in the appended claims.

The nuclear allylation of dihydroxybenzenes, such as resorcin and catechol, with allyl chloride involves an exothermic reaction which has to be carefully controlled in order to avoid polymerization and secondary reactions. To accomplish this, resorcin is dissolved in a comparatively large body of a buffer solution, preferably acid sodium phosphate, $NaH_2PO_4$. To this buffer solution containing resorcin is added allyl chloride as a series of fractional portions, preferably 0.1 aliquot. To prevent decomposition and secondary reactions 0.1 aliquot of 45% sodium hydroxide solution are added to the resorcin solution in advance of the adding of the allyl chloride aliquots. In promoting the reaction, the solution is actively stirred and the caustic soda is distributed throughout the solution before the allyl chloride is added. The aliquots of caustic soda and allyl chloride are alternately added with the caustic always being added in advance of the addition of allyl chloride. The reaction solution is maintained by external cooling at a temperature of 42° to 45° C. and the addition of the caustic soda and the allyl chloride is carefully observed to maintain the pH of the solution between 5 and 7. When sufficient allyl chloride has been added to react with all of the resorcin in the reaction mass, the temperature of the reaction mixture is raised to about 85° C. and the excess allyl chloride which has been added is distilled off. Thereafter the contents of the still are cooled to 50° to 65° C., whereupon an upper oily layer of diallyl resorcin separates from the sodium chloride-sodium phosphate solution. The sodium chloride-sodium phosphate solution is separated from the oily liquid and the oily liquid is thereupon washed several times with a 25% water solution of sodium bisulphite using vigorous agitation with each washing. After each washing the sodium bisulphite is separated from the diallyl resorcin and then a final washing is carried out with a 25% solution of secondary sodium phosphate $Na_2HPO_4$. The secondary sodium phosphate is separated from the diallyl resorcin and thereafter the diallyl resorcin is refined by vacuum steam stripping in which the temperature of the diallyl resorcin is not raised above 80° C.

In the above process the reactants are used in the following proportions: 14 mols of technical resorcin when dissolved in a 5 mol water solution of said sodium phosphate and using ten aliquots of 3.5 mols each, of sodium hydroxide and allyl chloride added to the resorcin alternately in accordance with the process described. A 95% minimum conversion of the resorcin to diallyl resorcin may be effected by the above process using the above proportions of reactants.

I have found that resorcin and catechol may be allylated with the allyl halide compounds, such as allyl chloride, allyl bromide or allyl iodide. Allyl chloride is preferred because it is available on the market at a reasonable price, although the other halides are effective in carrying out allylation.

In place of the use of caustic soda as a base for neutralizing the hydrochloric acid formed in the reaction, other alkali metal bases, as well as alkaline earth hydroxide may be used.

The diallyl resorcin produced by the present process has a refractive index of 1.564 at 24° C., and a boiling point of 165° C. at 3 mm. pressure. The product has a red-brown color, a specific gravity of 1.076 at 24° C., and a molecular weight of 194 to 195.

The diallyl resorcin is stable, soluble in alkalis, aromatics, alkyl alcohols, and glycerides such as linseed oil, chinawood oil and the like. The product is only slightly soluble in water.

The preferred form of the invention having been thus described, what is claimed as new is:

1. A process of allylating dihydroxybenzene comprising: dissolving the dihydroxybenzene in an acid reacting buffer solution, adding a series of aliquots of allyl halide with stirring in the presence of a base while maintaining a pH of the reaction solution between 5 and 7.

2. The process defined in claim 1 in which the dihydroxy-benzene is resorcinol.

3. The process defined in claim 1 in which the dihydroxy-benzene is catechol.

4. The process defined in claim 1 in which the reaction mixture is maintained at a temperature of 42° to 45° C.

5. The process defined in claim 1 in which the buffer solution is acid sodium phosphate.

6. The process defined in claim 1 in which the base is a 45% solution of caustic soda.

7. The process of allylating resorcin comprising: dissolving the resorcin in an acid sodium phosphate solution, slowly adding aliquots of caustic and allyl chloride to the resorcin solution while stirring and maintaining the reaction solution at a substantially uniform temperature with its pH between 5 and 7.

8. The process defined in claim 7 in which the aliquots of sodium hydroxide are added in advance of the aliquots of allyl chloride.

9. The process defined in claim 7 in which the aliquots of caustic soda and allyl chloride are added to the resorcin solution alternately with the caustic soda always being added in advance of the addition of allyl chloride aliquots.

10. The process defined in claim 7 in which the reaction solution is maintained at a temperature of 42° to 45° C.

11. The process defined in claim 7 in which the aliquots are about 0.1 of the entire amounts of caustic soda and allyl chloride used.

12. The process defined in claim 7 in which the components are reacted in the proportions of 14 mols of resorcin to 35 mols of allyl chloride in the presence of a water solution of 5 mols of acid sodium phosphate and 35 mols of caustic soda.

13. The process defined in claim 7 in which the diallyl resorcinol produced is refined by washing the sodium bisulphite solutions and then vacuum steam stripping the diallyl resorcin to remove contaminants, such as alcohols or ethers.

KENNETH P. MONROE.

REFERENCES CITED

The following references are of record in the file of this patent:

UNITED STATES PATENTS

| Number | Name | Date |
|---|---|---|
| 2,302,363 | Bellefontaine | Nov. 17, 1942 |

OTHER REFERENCES

Hurd et al.: Chem. Abs., vol. 32, 1671-2 (1938).